United States Patent [19]
Geis

[11] 3,889,782
[45] June 17, 1975

[54] MATERIAL HANDLING VEHICLE HAVING HIGH GROUND CLEARANCE POWER TRANSMISSION AND WHEEL SUPPORT MEANS

[75] Inventor: Warren P. Geis, Port Washington, Wis.

[73] Assignee: Koehring Company, Milwaukee, Wis.

[22] Filed: June 11, 1973

[21] Appl. No.: 369,008

[52] U.S. Cl. .................................. 187/9; 180/54 E
[51] Int. Cl.² ...................... B66B 9/20; B60K 17/00
[58] Field of Search ........ 180/54 E, 54 D, 54 F, 56, 180/57, 55; 187/9

[56] References Cited
UNITED STATES PATENTS

| | | | |
|---|---|---|---|
| 2,256,314 | 9/1941 | Dunham | 180/54 E |
| 2,299,445 | 10/1942 | Weaver | 180/54 E X |
| 2,438,534 | 3/1948 | Bowers | 180/54 F |
| 3,005,562 | 10/1961 | Shaffer | 187/9 X |

*Primary Examiner*—David Schonberg
*Assistant Examiner*—Milton L. Smith
*Attorney, Agent, or Firm*—Andrew J. Beck

[57] ABSTRACT

A self-propelled material handling vehicle, such as a forklift truck, comprises a chassis having load handling components at one end thereof which are movable into and out of position below the bottom of the chassis. A pair of driven ground wheels are located at the sides of the chassis behind the load handling components and each wheel has an axle which is located near the bottom of the chassis. Power transmission and wheel support means are provided and comprise an inverted U-shaped housing having an upper portion transversely disposed above the bottom of the chassis and depending end portions which extend downwardly on the outer sides of the chassis below the bottom thereof. The inner side of each depending portion of the housing is rigidly secured to the chassis. A transmission unit, a differential unit and differential drive shafts are mounted in the upper portion of the housing. Each wheel axle is rotatably mounted within and projects from a depending portion of the housing. A drive gear means for transmitting power from each differential drive shaft to an associated wheel axle is mounted within each depending portion of the housing. The inverted U-shaped power transmission and wheel support means provides increased clearance space between the bottom of the vehicle and ground, as compared to vehicles using similarly sized wheels and conventional differential means.

11 Claims, 12 Drawing Figures

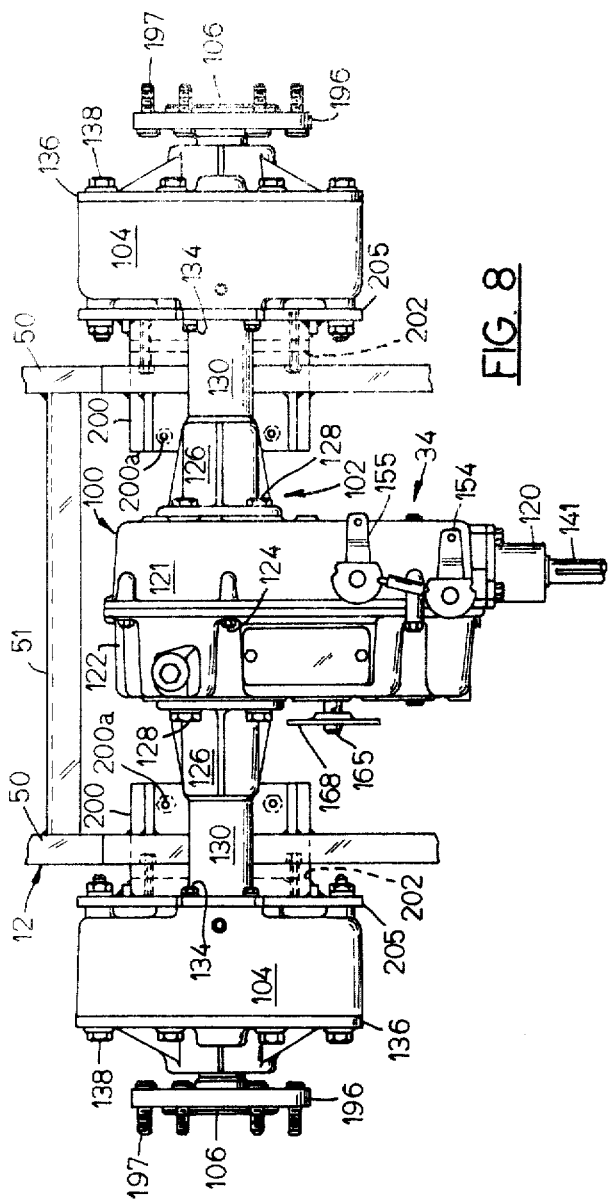

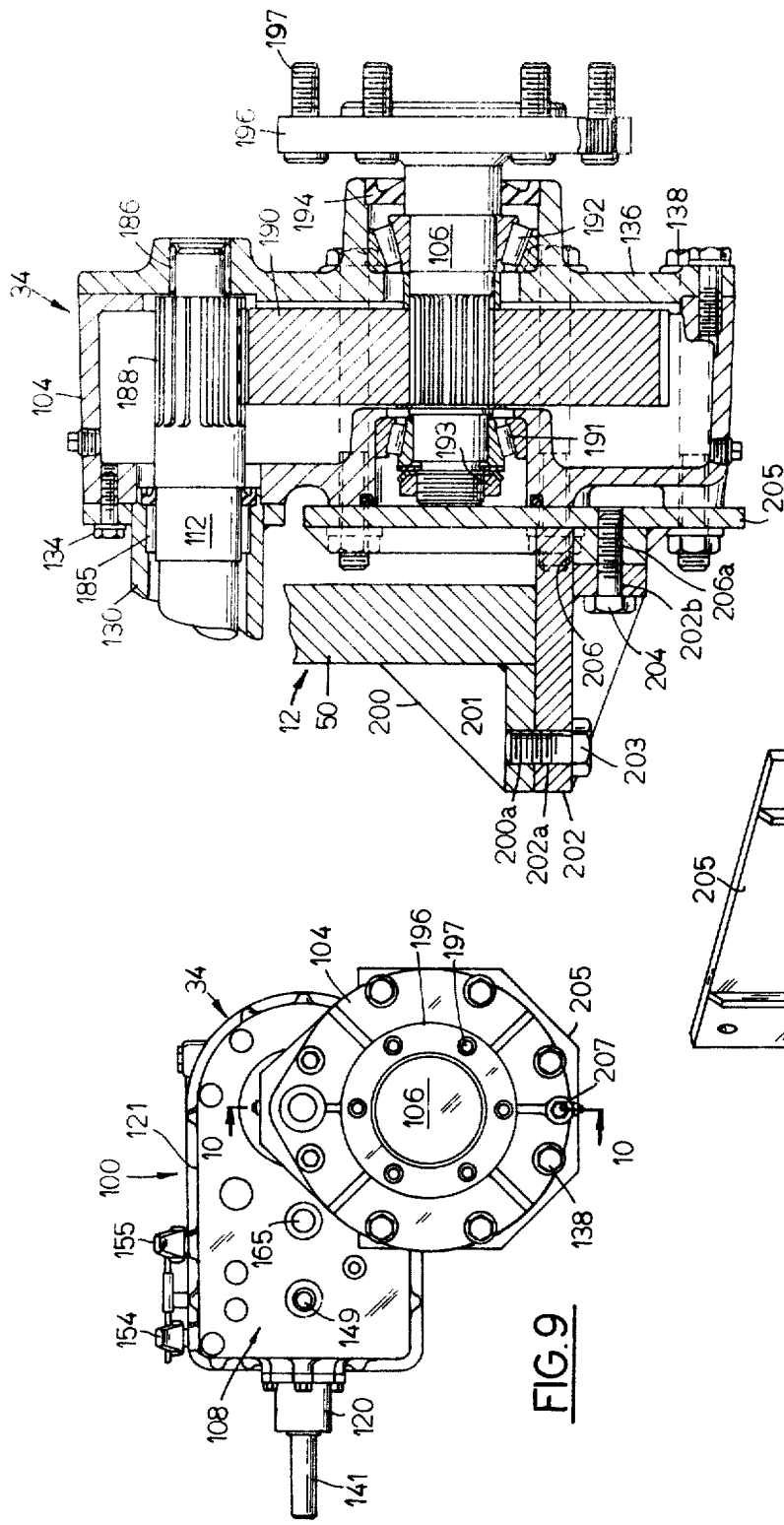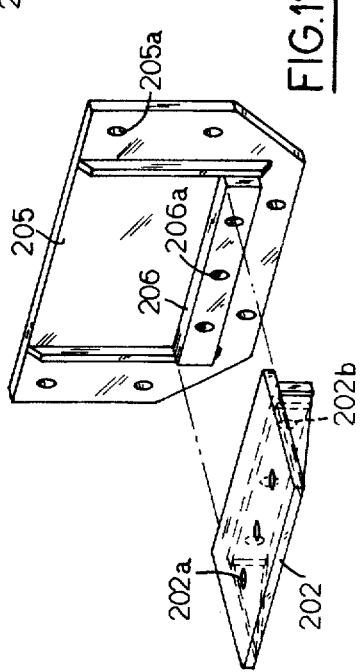
FIG. 10
FIG. 11
FIG. 9

MATERIAL HANDLING VEHICLE HAVING HIGH GROUND CLEARANCE POWER TRANSMISSION AND WHEEL SUPPORT MEANS

BACKGROUND OF THE INVENTION

1. Field of Use

This invention relates generally to self-propelled material handling vehicles, such as forklift trucks and, particularly, to high ground clearance power transmission and wheel support means for the driven wheels thereof.

2. Description of the Prior Art

Some prior art self-propelled material handling vehicles, such as forklift trucks, comprise a mast and forklift unit at one end of the vehicle chassis, a pair of driven ground wheels mounted at said one end of the chassis directly behind the mast, and one or more steerable ground wheels at the other end of the chassis. Heretofore, the driven ground wheels were supported on and powered by a conventional banjo-type differential and axle assembly which was mounted beneath the chassis. Typically the housing of the differential and drive axle assembly extended well below the bottom of the chassis and the outer ends of the drive axles were connected directly to the ground wheels. The downwardly projecting portions of the housing, especially that part wherein the differential was housed, substantially reduced the ground clearance of the lift truck. Normally, it is desirable to have relatively high clearance between the bottom of the differential and wheel axle housing and ground so that rough terrain or objects on the ground will not interfere with lift truck movements during load handling operations. However, the only way to achieve relatively high ground clearance in prior art vehicles using conventional differential and axle assemblies of the aforedescribed character and arrangement was to use driven ground wheels of relatively large diameter so as to raise the vehicle chassis. This approach is undesirable because it requires disproportionately large and more costly ground wheels and necessitates design features in the truck to accommodate larger driven wheels, as compared to similarly rated trucks having smaller driven wheels.

SUMMARY OF THE PRESENT INVENTION

In accordance with the present invention, a self-propelled material handling vehicle, such as a forklift truck, comprises a chassis having an engine-driven hydraulic pump and a pump-driven hydraulic motor thereon. The chassis is provided with a pair of non-steerable motor-driven front ground wheels at its front end and a pair of hydraulically steerable non-driven rear ground wheels at its rear end. A two-stage upright hydraulically tiltable mast is mounted at the front end of the chassis ahead of the front ground wheels and the mast carries a hydraulically movable forklift unit. Portions of the mast and the forklift unit are movable during use to positions above and below the bottom of the chassis. High ground clearance power transmission and wheel support means are provided for the front ground wheels to afford maximum clearnace between the bottom of the front end of the chassis and the ground. Such means enable the truck to maneuver over obstructions when portions of the mast and forklift unit are raised above the bottom of the chassis. Such means comprise a rigid inverted U-shaped hollow supporting housing having an intermediate upper portion transversely disposed above the bottom of the chassis and a pair of downwardly depending end portions which extend below the bottom of the chassis on opposite outer sides thereof. The housing is rigidly secured to and supported on the chassis by bolting the depending portions to the sides of the chassis and each depending portion rotatably supports an outwardly extending front ground wheel axle. A transmission unit driven by the hydraulic motor, a differential and differential driven shafts are mounted within the intermediate or upper portion of the housing. Drive gear means are mounted within each depending portion of the housing to transmit motive power from the differential shaft to the wheel axle.

More specifically, a shiftable transmission unit and a differential unit are mounted in an enlarged portion of the upper portion of the housing intermediate of its ends. Rotatable drive shafts extend from opposite sides of the differential unit through transversely extending portions of the upper portion of the housing. Outwardly extending wheel axles are rotatably mounted within the lower ends of the depending portions of the housing and each axle is connected to an associated front ground wheel. A large gear is rotatably mounted in each depending portion of the housing and is in constant mesh with a splined portion of the differential drive shaft and a splined portion of a wheel axle to transmit drive power from the differential drive shaft to its associated wheel axle.

A lift truck in accordance with the invention has several advantages over prior art trucks. For example, greater ground clearance exists between the bottom of the chassis of the lift truck and ground, thereby enabling the truck to operate in rough terrain or in obstructed areas which would be inaccessible to conventional trucks. Furthermore, these advantages are obtained without the use of larger and more costly ground wheels, as would be the case with comparably sized and rated lift trucks using conventional power transmission and wheel support means. Also, lift trucks in accordance with the invention are relatively easy and economical to fabricate and assemble. Then too, the components thereof are readily accessible for servicing and maintenance. Other objects and advantages of the invention will hereinafter appear.

DRAWINGS

FIG. 7 is an enlarged elevation view of the rear side of the front wheel power transmission and wheel support means of a truck in accordance with the invention;

FIG. 8 is a top plan view of the power transmission and wheel support means shown in FIG. 7;

FIG. 9 is an elevation view of the right end of the power transmission and wheel support means taken on line 9 - 9 of FIG. 7;

FIG. 10 is an enlarged cross section view of the right end of the power transmission and wheel support means taken on line 10 - 10 of FIG. 9;

FIG. 11 is an exploded perspective view of support member shown in FIGS. 9 and 10.

DESCRIPTION OF A PREFERRED EMBODIMENT

General Arrangement

Figure 1:
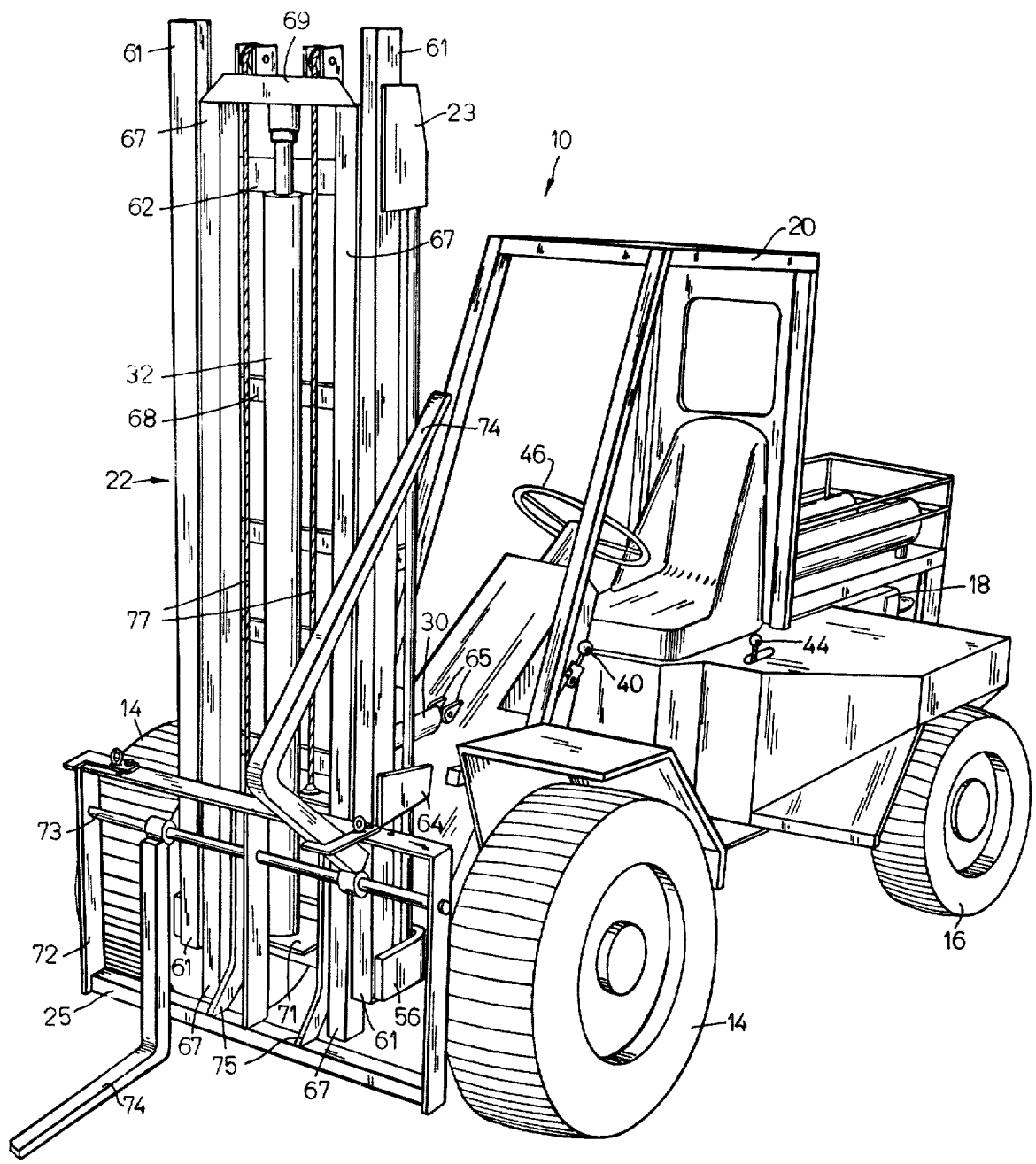
FIG. 1 is a perspective view of a forklift truck in accordance with the invention showing the left side and front end thereof.

Referring to FIGS. 1 through 5 of the drawings, the numeral 10 designates a self-propelled material handling vehicle, such as a forklift truck, in accordance with the present invention. Generally considered, truck 10 comprises a chassis 12, a pair of non-steerable hydraulically driven rubber-tired left and right front ground wheels 14 and a pair of hydraulically steerable non-driven rubber-tired left and right rear ground wheels 16. Truck 10 further comprises a conventional internal combustion engine 18 mounted at the rear end of chassis 12, an operator's cab or station 20 at the center of the chassis, and material handling apparatus 22 at the front end of the chassis. The apparatus 22 comprises a two-stage upright tiltable mast 23 and a forklift unit 25 mounted for vertical movement thereon. A variable output swash plate type hydraulic pump 24 having a control lever 27 is mounted on and driven by engine 18 and supplies operating fluid to a hydraulic motor 26 which powers the front wheels 14; to a steering cylinder 28 which effects steering movement of the rear wheels 16; and to a tilt cylinder 30 and a lifting cylinder 32 for operating the material handling apparatus 22. Hydraulic motor 26 is connected to and provides motive power to a power transmission and wheel support unit 34 for the front wheels 14, hereinafter described in detail. Operating controls are located in cab 20 and comprise an accelerator pedal 36 connected by a control linkage 37 to the lever 27 of pump 24, a manual shift lever 38 connected by a control linkage 39 to unit 34, a manual brake lever 40 connected by a linkage 41 to unit 34, manual control levers 42 and 44 for controlling the material handling apparatus 22, and a steering wheel 46.

The Chassis

Figure 2:
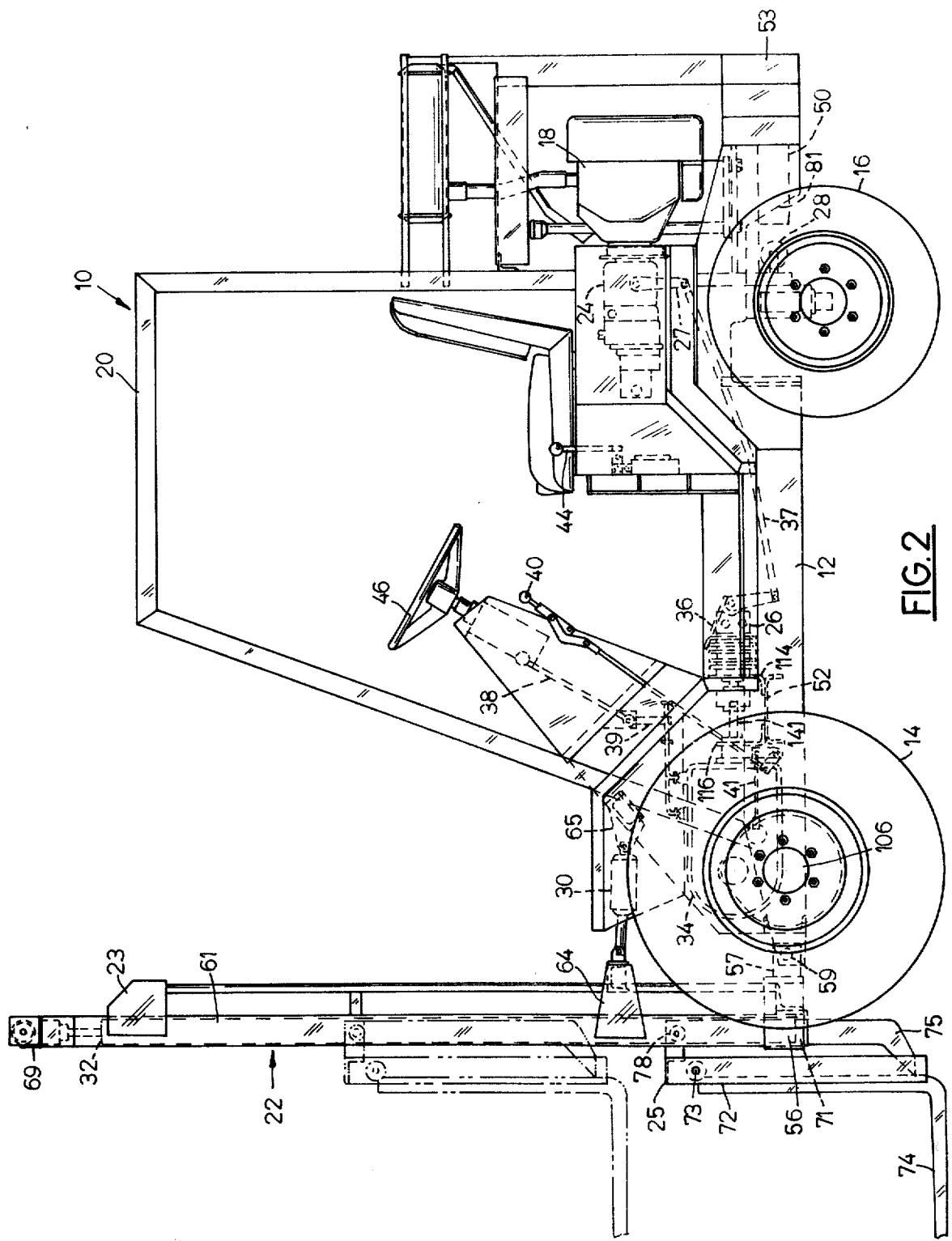
FIG. 2 is an elevation view of the left side of the truck shown in FIG. 1.
Figure 3:
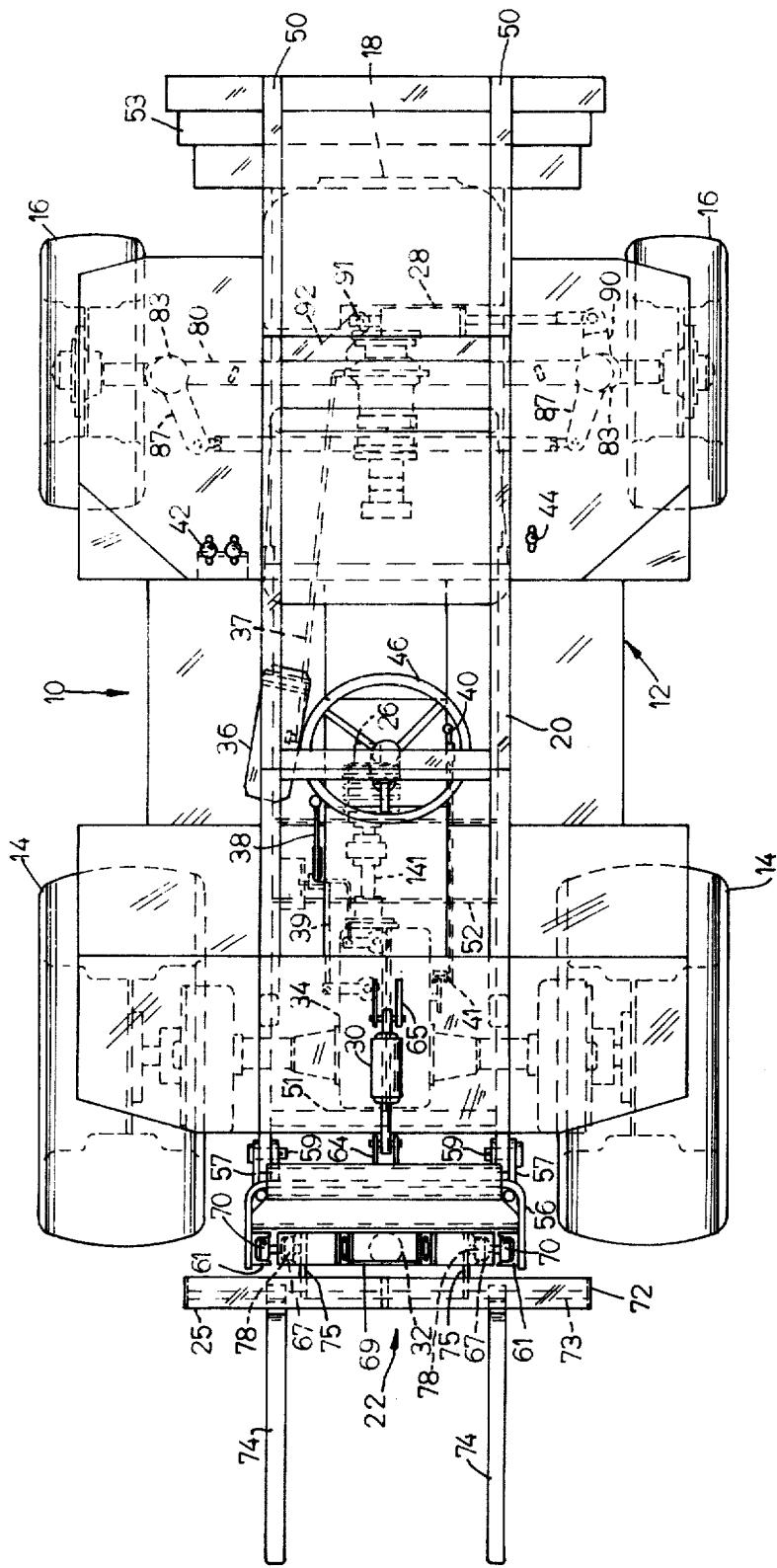
FIG. 3 is a top plan view of the truck shown in FIGS. 1 and 2.
Figure 5:
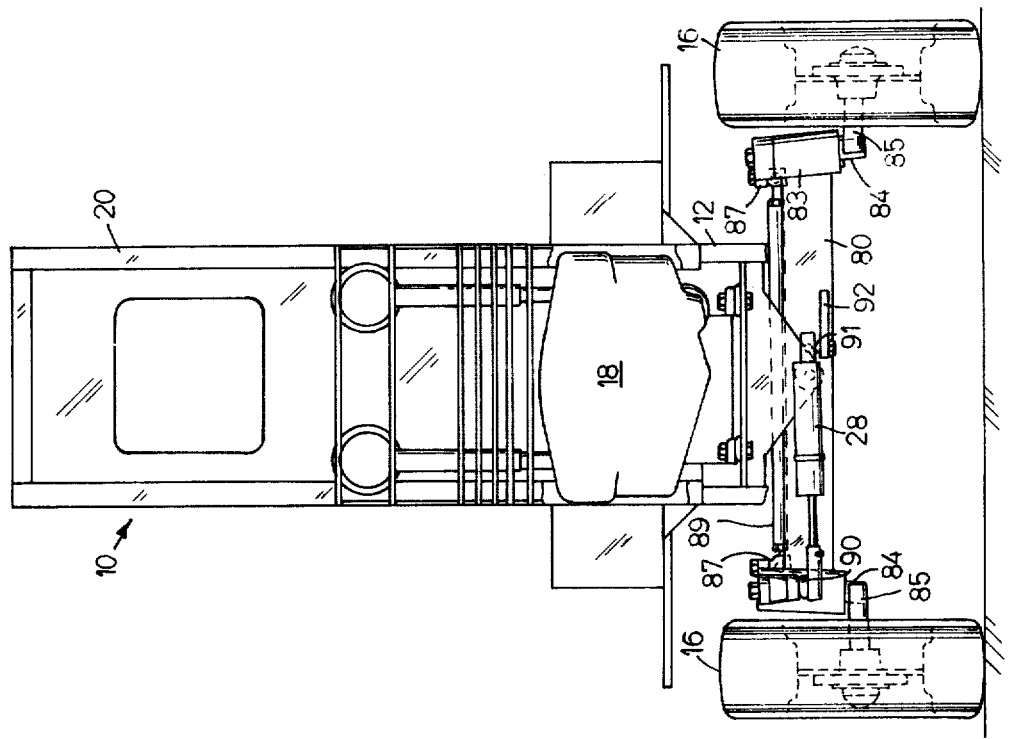
FIG. 5 is an elevational view of the rear end of the truck shown in FIGS. 1, 2, 3 and 4.
Figure 4:
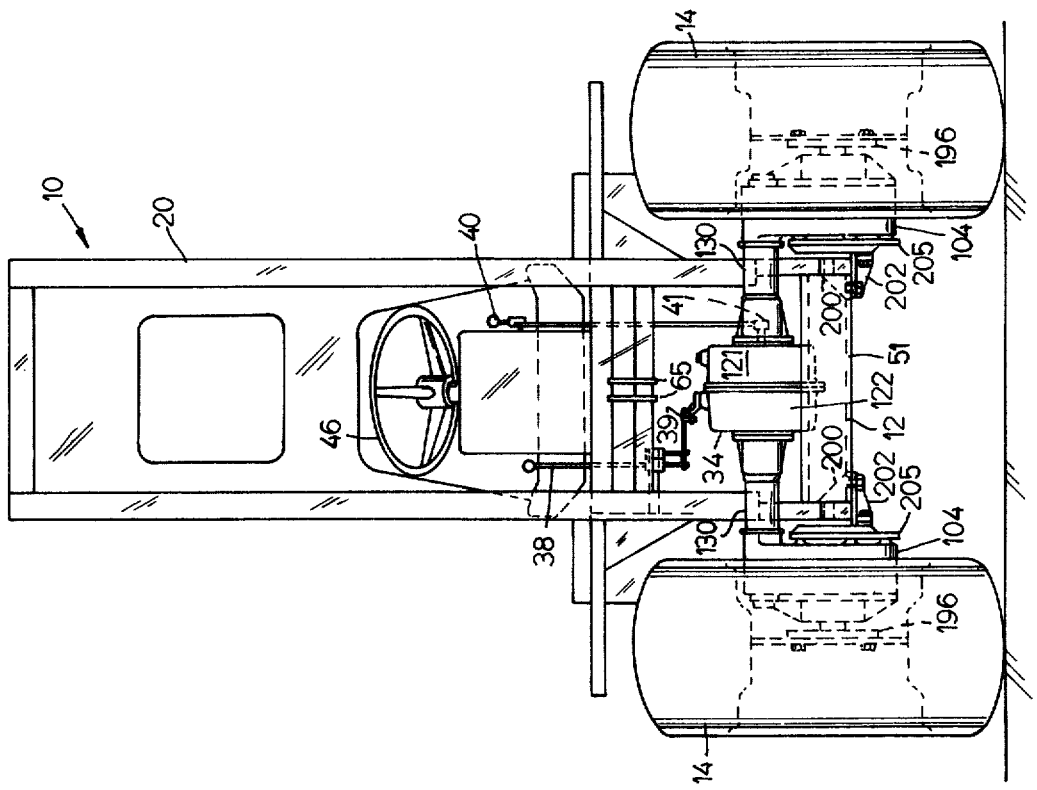
FIG. 4 is an elevation view of the front end of the truck shown in FIGS. 1, 2 and 3.
Figure 6:
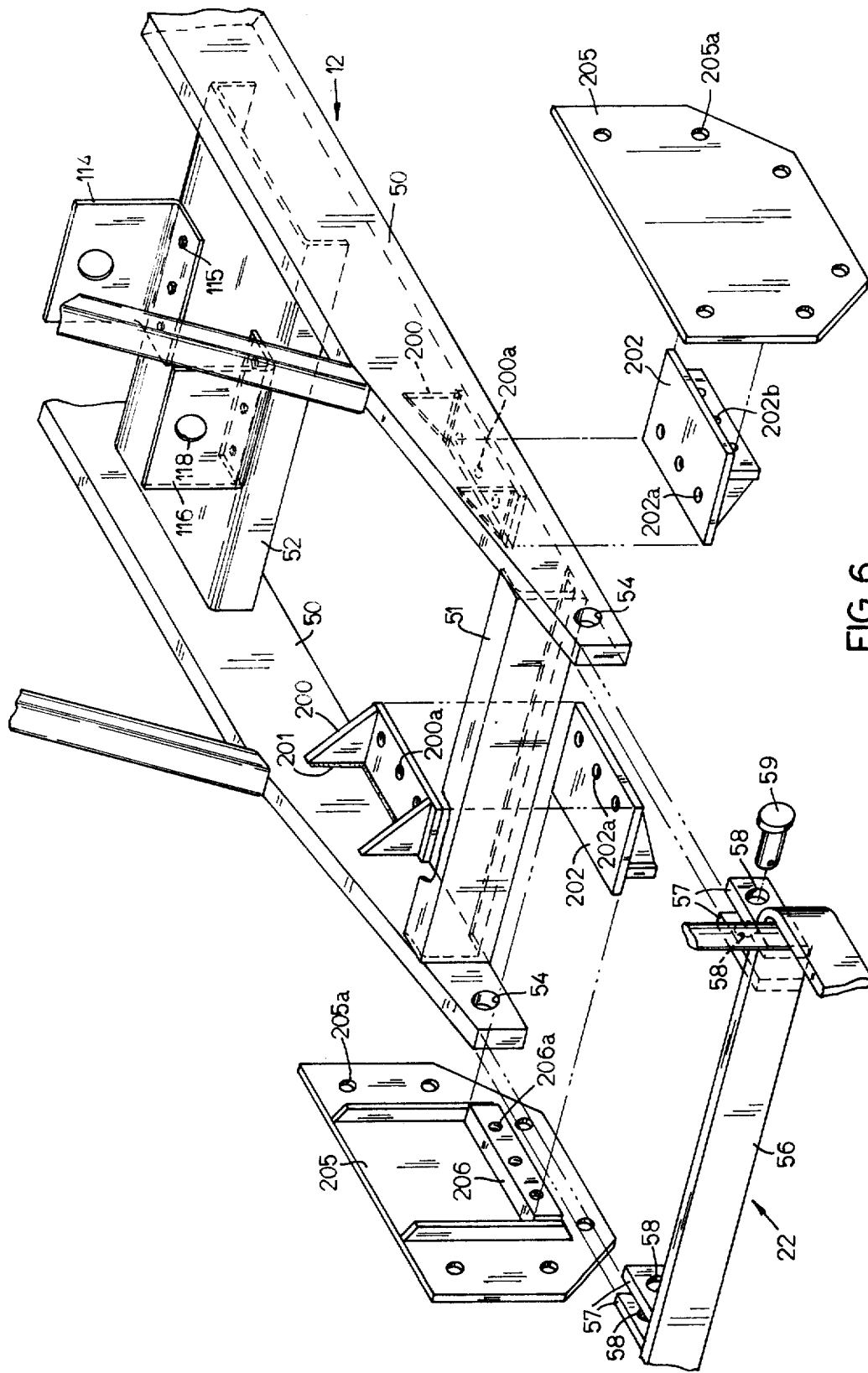
FIG. 6 is an enlarged isometric exploded view, with portions broken away, of the front end and the left side of the truck chassis.

As FIGS. 2 through 6 best show, chassis 12 comprises a pair of rigid spaced apart longitudinal members 50 of rectangular cross-sectional configuration which are rigidly joined together by a plurality of cross brace members welded therebetween, including a channel iron front brace 51 and a channel shaped plate 52 shown in FIG. 6. A set of counterweights 53 are mounted at the rear of the chassis, as FIGS. 2 and 3 show. All of the components forming chassis 12 are located in or above a flat plane which defines the bottom of the chassis. As FIG. 6 shows the longitudinal members 50 of chassis 12 project forwardly beyond front brace 51 and are provided with mounting holes 54 for the material handling apparatus 22.

The Material Handling Apparatus

Referring to FIGS. 1, 2, 3 and 6, the material handling apparatus 22 comprises the two-stage upright tiltable mast 23, the forklift unit 25 mounted for vertical movement thereon, the extendable and retractable tilt cylinder 30, and the extendable and retractable lifting cylinder 32. Mast 23 comprises a generally U-shaped, forwardly projecting base member 56 having two spaced apart pairs of spaced rearwardly extending support brackets 57 welded thereto. The brackets 57 have holes 58 which register with the mounting holes 54 on chassis 12 and which accommodate pins 59 by means of which mast 23 is tiltably supported on the chassis. It is to be noted that base member 56 is disposed slightly above the bottom of chassis 12.

Mast 23 further comprises a pair of horizontally spaced apart upright outer members or guide rails 61, in the form of channel irons, which are welded at their lower ends to and supported by base member 56. The rails 61 are rigidly joined together by a plurality of vertically spaced apart cross braces 62 which are welded therebetween. The tilt cylinder 30 is pivotably connected between a control bracket 64 welded to the rails 61 and a bracket 65 rigidly secured to the body of the truck 10.

Mast 23 also comprises a pair of horizontally spaced apart upright inner members or guide rails 67, in the form of channel irons, which are rigidly joined together by a plurality of vertically spaced apart cross braces 68 which are welded therebetween tad by a top brace 69. The inner members 67 are movable upwardly and downwardly as a unit with respect to the outer member 61 by means of lifting cylinder 32 which is rigidly connected at its lower end to a support plate 71 attached to and between the outer members 61. The upper end of lifting cylinder 32 is rigidly connected to the top brace 69 for the inner members 67. Guide members 70 (see FIG. 3) are understood to be provided on the outer sides of the rails 67 and engage the channels of the guide rails 61. It is to be noted that the lower ends of the inner member 67 are movable into and out of postion below the bottom of chassis 12.

The forklift unit 25 takes the form of a rectangular grill 72 having a fork pivot shaft 73 on which a pair of L-shaped forks 74 are swingably and slidably mounted. Grill 72 is provided with a pair of brackets 75 which extend rearwardly between the inner guide rails 67 and to which a pair of cables 77 are attached. Guide members 78 are provided on the outer sides of the brackets 75 and engage the channels of the guide rails 67. It is to be noted that the forklift unit 25 is movable into and out of position below the bottom of chassis 12, as FIG. 2 shows.

The Rear Wheel Assembly

Referring to FIGS. 2, 3, 4 and 5, the rear wheel assembly comprises a rigid solid member 80 of rectangular cross-sectional configuration which is transversely disposed on chassis 12 and welded thereto in relieved or notched portion 81 therein, as FIG. 2 shows. Member 80 is provided at its opposite ends with rigidly attached outwardly and downwardly sloped spindle housings 83 wherein spindles 84 are rotatably mounted. The bottom end of each spindle 84 projects from its housing 83 and is rigidly connected to a short outwardly projecting axle 85 on which a rear wheel is rotatably mounted. The top end of each spindle 84 also projects from its housing 83 and is rigidly connected to a forwardly and inwardly extending steering arm 87. The pair of steering arms 87 are pivotably connected to the ends of a tie rod 89. The spindle 84 for the left rear wheel 16 is also rigidly connected to a rearwardly extending steering link 90 which is pivotably connected to one end of steering cylinder 28. The other end of steering cylinder 28 is pivotably connected to a ball joint 91 on a support bracket 92 which is secured as by welding to the rear side of member 80. It is to be noted that the rear wheels 16 are spaced apart a greater distance than that of the front wheels 14 and, therefore, any portion of the rear wheel assembly projecting below the bottom of chassis 12, does so in a region laterally beyond the clearance space near the bottom of the front end of the chassis.

The Front Wheel Driving and Supporting Assembly

Referring to FIGS. 2, 3, 4, 7 and 8, there is shown the power transmission and support means or unit 34 in accordance with the invention for the front wheels 14 which provides high ground clearance for vehicle 10. Generally considered, unit 34 comprises a rigid hollow housing 100 in the general shape of an inverted U and having an intermediate upper portion 102 and a pair of downwardly depending end portions 104. Housing 100 is disposed so that the intermediate portion 102 is transverse to or athwart the chassis 12 and so that end portions extend downwardly on the outer sides of the chassis and below the bottom thereof. Housing 100 is supported on chassis 12 by connection means, hereinafter described, between the chassis and the inner sides of the depending portions 104. The front wheels 14 are supported on axles 106 mounted on the depending portions 104, as hereinafter described. As hereinafter described in detail, a shift unit 108 and a differential unit 110 are mounted within the upper portion 102 of housing 100 intermediate of its ends. Rotatable drive shafts 112 extend from opposite sides of the differential unit 110 through the upper portion 102 of housing 100. Outwardly extending wheel axles 106 are rotatably mounted near the lower ends of the depending portions 104 and each axle is connected to drive a front ground wheel 14. Gear means are provided in each hollow depending portion 104 of housing 100 to transmit drive power from a drive shaft 112 to its associated wheel axle 106.

As hereinafter appears, housing 100 comprises a plurality of components which are secured together to provide a strong rigid integral unit capable of supporting truck 10.

As FIGS. 2, 3 and 6 make clear, hydraulic motor 26 is supported on an L-shaped bracket 114 which is secured to cross brace 52 by bolts 115. Cross brace 52 also provides support for another L-shaped bracket 116 having a hole 118 therein for accommodating a propeller shaft bearing support housing 120 on transmission unit 34. However, bracket 116 is primarily intended as an aid in centering the location of transmission unit 34 for attachment to chassis 12 during manufacture and plays no significant part in mechanically securing unit 34 to the chassis.

Referring to FIGS. 7, 8, 9, 10, and 12, unit 34 exhibits a generally U-shaped configuration when viewed from the front or rear side and comprises a hollow central housing portion formed by two housing sections 121 and 122 which are secured together by a plurality of bolts 124; a pair of hollow generally cylindrical bearing carriers 126 extending outwardly on opposite sides of the central housing and secured thereto by bolts 128; a pair of hollow generally cylindrical axle drive shaft housings 130, each extending outwardly from a carrier 126 and secured thereto as by welding at 132; and a pair of downwardly depending hollow wheel axle housings 104 attached to the outer ends of the drive shaft housings 130 by bolts 134. Each wheel axle housing 104 is provided with a housing cover 136 on its outer side which is secured thereto by bolts 138.

Figure 12:
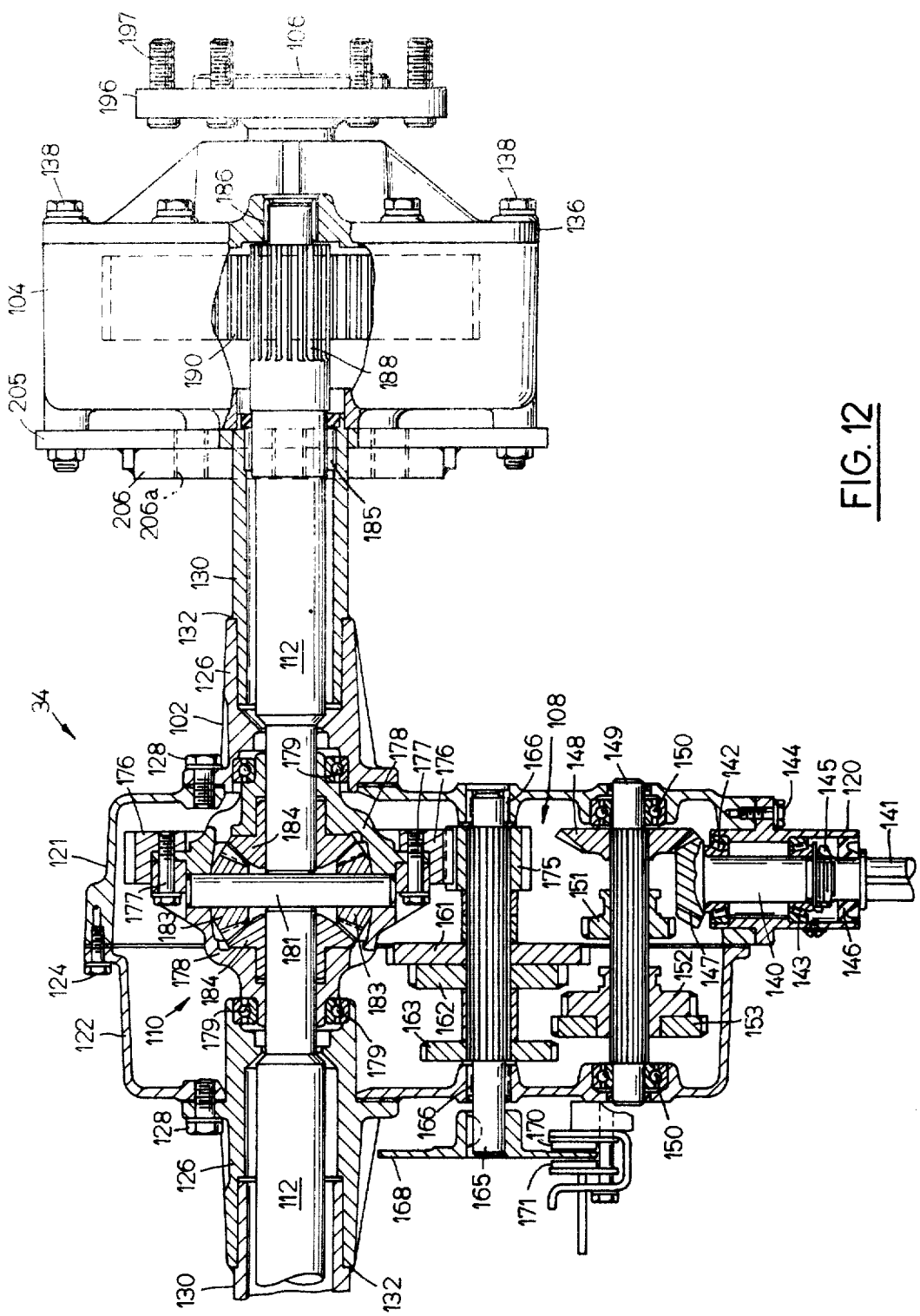
FIG. 12 is an enlarged cross section view of the power transmission and wheel support means taken on line 12 —12 of FIG. 7.

As FIG. 12 shows, the central part of upper portion 102 of housing 100 houses a differential unit or assembly 110 in its forward end and a transmission unit or assembly 108 in its rear end. The transmission assembly 108 comprises a propeller shaft 140 which is connected to and driven by the drive shaft 141 of hydraulic motor 26. Propeller shaft 140 is journalled for rotation in a front roller bearing assembly 142 and a rear roller bearing assembly 143 which are supported in propeller shaft bearing support housing 120 which is secured by bolts 144 to housing 100. A bearing retainer nut 145 is provided on propeller shaft 140 and a bearing seal 146 is provided in housing 120 around the propeller shaft. The propeller shaft 140 has a pinion gear 147 secured to its inner end.

Pinion gear 147 is in constant mesh with an input gear 148 which is spline-connected to the input shaft 149 of the transmission assembly 108. The opposite ends of input shaft 149 are journalled for rotation in a pair of input shaft ball bearing assemblies 150 mounted on the inside walls of housing 100. A low speed gear 151 and a medium speed gear 152 are spline-connected to and slideable on input shaft 149 and a high speed gear 153 is mounted on the hub of and rotatable with the medium speed gear 152. The gears 151, 152, and 153 are selectively movable to various shifting positions by operation of pivotably movable shift levers 154 and 155 on the top exterior of housing 100. The shift levers are operated by linkage 39 in response to manipulation of shift control lever 38.

The gears 151, 152, and 153 are adapted, when appropriately shifted, to engage the non-slideable gears 161, 162, and 163, respectively, which are spline-connected to and effect rotation of an output shaft 165. The opposite ends of output shaft 165 are journalled for rotation in a pair of output shaft sleeve bearings or bushings 166 mounted on the inside walls of housing 100. One end of the output shaft 165 projects from housing 100 and has a brake disc 168 key-connected thereto which is engagable between a stationary brake pad 170 and a reciprocably movable brake pad 171, to stop rotation of transmission unit 108. Brake pad 171 is connected to and reciprocably movable by the linkage 41 from brake lever 40.

Output shaft 165 has an output gear 175 thereon which is in constant mesh with a ring gear 176 of differential assembly 110. Ring gear 176 is rigidly connected by bolts 177 to a case 178 which is mounted for rotation on a pair of ball bearing assemblies 179 which are supported in the bearing carriers 126 hereinbefore referred to. Case 178 supports a differential pinion shaft 181 which is journalled for rotation thereon and has differential pinion gears 183 rotatably mounted at opposite ends thereof. The pinion gears 183 are in constant mesh with side gears 184 which are connected to and effect rotation of the drive shafts 112. Each drive shaft 112 extends outwardly the central housing, through an associated carrier 126 and an associated drive shaft housing 130 into an associated wheel axle housing 104. Each drive shaft 112 is supported for rotation by being journalled in an inner bearing or bushing 185 mounted in the end of axle drive shaft housing 130 and in an outer bearing or bushing 186 mounted in wheel axle housing cover 136. Each drive shaft 112 has a spline gear 188 integrally formed therein near its outer end which is in constant mesh with a wheel axle gear 190.

As FIGS. 10 and 12 show, each wheel axle gear 190 is spline-connected to and drives a wheel axle 106 which is journalled for rotation on inner and outer roller type wheel bearing assemblies 191 and 192, respectively. The bearings 191 and 192 are mounted on the housing portion 104 and the housing cover 136, respectively. A bearing retainer nut 193 is disposed on the inner end of each wheel axle 106 and a bearing seal 194 is provided around each wheel axle for the outer bearing 192. Each wheel axle 106 terminates in a wheel hub 196 which is located on the outer side of the associated wheel axle housing 104. Each hub is provided with wheel bolts 197 for securing a front wheel 14 thereto.

Referring to FIGS. 4, 6, 7, 8, 9, 10, 11 and 12, means are provided to rigidly mount the unit 34 on chassis 12. Such means comprise a pair of inner brackets 200 which are rigidly secured as by welding as at 201 to the inside surfaces of the member 50 of chassis 12. A pair of bottom brackets 202 are secured as by bolts 203 to the bottom of the inner bracket 200 and extend outwardly beneath the chassis member 50. A pair of outer brackets or mounting plates 205 are secured as by bolts 204 to the bottom brackets 202 and extend upwardly alongside the outside of the chassis members 50.

As FIG. 6 best shows, each inner bracket 200 is welded to a member 50 and has mounting holes 200a through its inwardly projecting bottom flange. Each bottom bracket 202 is substantially T-shaped and has mounting holes 202a through one side of its top plate and mounting holes 202b through its downwardly projecting flange. Each outer bracket 205 is substantially flat having mounting holes 205a therethrough and is provided on its inwardly facing surface with a support member 206 welded thereto which has threaded mounting holes 206a therethrough. Support member 206 serves as a ledge or shoulder on which the other side of the top plate of bracket 202 rests. The brackets 200 and 202 are provided with suitable strengthening gussets, as shown in FIG. 6. Each outer bracket or mounting plate 205 is secured by bolts 138 to the inner side of depending portion or housing 104.

The aforedescribed arrangement of mounting brackets insures that unit 34 is rigidly secured to chassis 12.

As FIG. 7 shows, the bottom of chassis 12 is totally unobstructed across the entire distance between the inner edges of the brackets 202. As is also apparent, if a conventional banjo type differential and axle arrangement were used with front wheels of the same size as the wheels 14 shown, portions of the housing thereof would extend downwardly below the bottom of chassis 12 and substantially reduce ground clearance. On the other hand, if a conventional banjo-type differential and axle arrangement were used and mounted above the bottom of chassis 12 in the same relative position as intermediate or upper portion 102 of housing 100 of unit 34, the axis of wheel rotation would be well above the chassis bottom and extremely large diameter front wheels would be required as compared to the diameter of the wheels 14.

Resumé

A self-propelled material handling vehicle, such as a forklift truck 10, comprises a chassis 12 having load handling components 25 and 67 at one end thereof which are movable into and out of position below the bottom of the chassis. A pair of driven ground wheels 14 are located at the sides of the chassis 12 behind the load handling components and each wheel has an axle 106 which is located near the bottom of the chassis 12. A power transmission and wheel support means or unit 34 is provided and comprises an inverted U-shaped housing 100 having an upper portion 102 transversly disposed above the bottom of the chassis and depending end portions 104 which extend downwardly on the outer sides of the chassis below the bottom thereof. The inner side of each depending portion 104 of the housing 100 is rigidly secured to the chassis by means of brackets 200, 202 and 205. A shiftable transmission unit 108, a differential unit 110 and a pair of differential drive shafts 112 are mounted in the upper portion 102 of the housing 100. Each wheel axle 106 is rotatably mounted within and projects from a depending portion 104 of the housing 100. A drive gear 190 for transmitting power from each differential drive shaft 112 to an associated wheel axle 106 is mounted within each depending portion 104 of the housing 100. The inverted U-shaped power transmission and wheel support unit 34 provides increased clearance space between the bottom of vehicle 10 and ground, as compared to comparably sized forklift trucks using similarly sized wheels and conventional differential means.

I claim:

1. In a self-propelled material handling vehicle:

a chassis, material handling apparatus mounted on said chassis and including a mast and a lift unit vertically movable on said mast, the bottom of said mast being disposed above the bottom of said chassis and said lift unit being movable into and out of a position below the bottom of said chassis, a propulsion unit mounted on said chassis, a pair of ground wheels located outwardly of and on opposite sides of said chassis behind said apparatus, an axle for each ground wheel extending outwardly and beyond a side of said chassis, and means for supporting said axles and for delivering motive power thereto from said propulsion unit, said means comprising an inverted U-shaped hollow rigid housing having an intermediate portion transversely disposed above the bottom of said chassis and a pair of end portions depending downwardly on the sides of said chassis below the bottom of said chassis, each end portion having an inner side and an outer side, each end portion being rigidly connected on its inner side to said chassis and supporting an axle, said means further comprising power transmission means disposed within said housing for transmitting motive power from said propulsion unit to said axles.

2. A vehicle according to claim 1 wherein said power transmission means comprising a differential and drive shafts extending from opposite sides thereof located within said intermediate portion of said housing, and gear means located within each depending portion of said housing for transmitting motive power from one of said drive shafts to an associated one of said axles.

3. In a self-propelled material handling vehicle: a chassis, material handling apparatus mounted on the front end of said chassis and including a mast and a lift unit vertically movable on said mast, the bottom of said mast being disposed above the bottom of said chassis and said lift unit being movable into and out of a position below the bottom of said chassis, a propulsion unit mounted on said chassis, a pair of driven front ground wheels located outwardly of and on opposite sides of said chassis behind said apparatus, an axle for each front ground wheel extending outwardly and beyond a side of said chassis, and means for supporting said axles and for delivering motive power thereto from said propulsion unit, said means comprising an inverted U-shaped hollow rigid housing having an intermediate portion transversely disposed above the bottom of said chassis and a pair of end portions depending downwardly on the sides of said chassis below the bottom of said chassis, each end portion having an inner side and an outer side, each end portion being rigidly connected on its inner side to said chassis and supporting an axle, said means further comprising power transmission means disposed within said housing for transmitting motive power from said propulsion unit to said axles.

4. A vehicle according to claim 3 wherein said power transmission means comprising a differential and drive shafts extending from opposite sides thereof located within said intermediate portion of said housing, and gear means located within each depending portion of said housing for transmitting motive power from one of said drive shafts to an associated one of said axles.

5. In a self-propelled material handling vehicle; a chassis, material handling apparatus mounted on said chassis and including a mast and a lift unit vertically movable on said mast, the bottom of said mast being disposed above the bottom of said chassis and said lift unit being movable into and out of a position below the bottom of said chassis, a propulsion unit mounted on said chassis, a pair of ground wheels located outwardly of and on opposite sides of said chassis behind said apparatus, an axle for each ground wheel extending outwardly and beyond a side of said chassis, and means for supporting said axles and for delivering motive power thereto from said propulsion unit, said means comprising an inverted U-shaped hollow rigid housing having an intermediate portion transversely disposed above the bottom of said chassis and a pair of end portions depending downwardly on the sides of said chassis below the bottom of said chassis, each end portion having an inner side and an outer side, each depending portion being rigidly connected on its inner side to said chassis and supporting an axle, said means further comprising power transmission means disposed within said housing for transmitting motive power from said propulsion unit to said axles, said power transmission means comprising a differential and drive shafts extending from opposite sides thereof located within said intermediate portion of said housing, and gear means located within each depending portion of said housing for transmitting motive power from one of said drive shafts to an associated one of said axles.

6. In a self-propelled material handling vehicle: a chassis, material handling apparatus mounted on the front end of said chassis and including a mast and a lift unit vertically movable on said mast, the bottom of said mast being disposed above the bottom of said chassis and said lift unit being movable into and out of a position below the bottom of said chassis, a propulsion unit mounted on said chassis, at least one steerable rear ground wheel located at the rear of said chassis, a pair of driven front ground wheels located outwardly of and on opposite sides of said chassis behind said apparatus, an axle for each front ground wheel extending outwardly and beyond a side of said chassis, and means for supporting said axles and for delivering motive power thereto from said propulsion unit, said means comprising an inverted U-shaped hollow rigid housing having an intermediate portion transversely disposed above the bottom of said chassis and a pair of end portions depending downwardly on the sides of said chassis below the bottom of said chassis, each end portion having an inner side and an outer side, each end portion being rigidly connected on its inner side to said chassis and supporting an axle, said means further comprising power transmission means disposed within said housing for transmitting motive power from said propulsion unit to said axles, said power transmission means comprising a differential and drive shafts extending from opposite sides thereof located within said intermediate portion of said housing, and gear means located within each depending portion of said housing for transmitting motive power from one of said drive shafts to an associated one of said axles.

7. A vehicle according to claim 6 wherein said power transmission means further comprises a shiftable transmission unit located within said intermediate portion of said housing.

8. A vehicle according to claim 7 wherein said propulsion unit comprises an internal combustion engine, a hydraulic pump driven by said engine and a hydraulic motor driven by said pump, said motor being an output shaft connected to said shiftable transmission.

9. In a self-propelled material handling vehicle including a chassis including a pair of side members, a propulsion unit supported on said chassis, and a pair of ground wheels, said vehicle further including material handling apparatus supported near one end of said chassis and comprising an upwardly extending mast and a lift unit selectively movable vertically on said mast to positions above and below said chassis, the lower end of said mast being mounted on said chassis above the bottom of said chassis, and means for moving said lift unit to said positions: means for supporting said ground wheels and for delivering motive power to said ground wheels from said propulsion unit, said means comprising a generally U-shaped housing having a laterally extending intermediate portion including lateral ends disposed above said side members of said chassis and downwardly depending end portions fixed to the ends of said intermediate portion and disposed outwardly of said side members of said chassis, means for connecting the said end portions to said side members, a stub axle extending outwardly of each said end portions for supporting one of said ground wheels, and shiftable transmission means within said housing for transmitting power from said propulsion unit to each stub axle.

10. In a self-propelled material handling vehicle including a chassis having opposite lateral side members, said vehicle further including material handling apparatus supported near one end of said chassis and comprising an upwardly extending mast and a lift unit selectively movable vertically on said mast to positions above and below said chassis, the lower end of said mast being mounted on said chassis above the bottom of said chassis, and means for moving said lift unit to said positions, a propulsion unit supported on said chassis, a pair of ground wheels near one end of said chassis, means for rotatably supporting said pair of ground wheels and for delivering motive power from said propulsion unit to said pair of ground wheels, said means comprising an inverted generally U-shaped hollow rigid housing having an intermediate portion disposed above said chassis and having downwardly depending end portions disposed outwardly of said opposite lateral sides of said chassis and rigidly supported by said chassis, said means further comprising a pair of stub axles for supporting said pair of ground wheels, each stub axle extending outwardly of one of said end portions, and said means further comprising shiftable transmission means disposed within said housing for transmitting motive power from said propulsion unit to said stub axles.

11. In a self-propelled material handling vehicle: a chassis having opposite lateral side members; said vehicle further including material handling apparatus supporting near one end of said chassis and comprising an upwardly extending mast and a lift unit selectively movable vertically on said mast to positions above and below said chassis, the lower end of said mast being mounted on said chassis above the bottom of said chassis, and means for moving said lift unit to said positions; a propulsion unit supported on said chassis; a pair of ground wheels near one end of said chassis, each ground wheel being disposed in a position outwardly of a lateral side of said chassis; and means for rotatably supporting said pair of ground wheels and for delivering motive power to said pair of ground wheels from said propulsion unit, said means comprising an inverted U-shaped hollow rigid housing having an intermediate portion transversely disposed above said chassis and a pair of end portions depending downwardly on the outward sides of said opposite lateral sides of said chassis, said means further comprising a pair of stub axles for said pair of ground wheels, each stub axle extending outwardly of an end portion of said housing, said means further comprising power transmission means disposed within said housing for transmitting motive power from said propulsion unit to said axles; and means for rigidly connecting each end portion of said housing to a side member of said chassis.

* * * * *